United States Patent
Cook

(10) Patent No.: US 9,467,325 B2
(45) Date of Patent: Oct. 11, 2016

(54) METHODS AND SYSTEMS FOR CONTROLLING A COMMUNICATION SESSION

(71) Applicant: Metaswitch Networks Ltd., Enfield (GB)

(72) Inventor: Alan Cook, Enfield (GB)

(73) Assignee: Metaswitch Networks Ltd., Enfield (GB)

(*) Notice: Subject to any disclaimer, the term of this patent is extended or adjusted under 35 U.S.C. 154(b) by 433 days.

(21) Appl. No.: 13/777,973

(22) Filed: Feb. 26, 2013

(65) Prior Publication Data

US 2013/0223432 A1    Aug. 29, 2013

Related U.S. Application Data

(60) Provisional application No. 61/603,871, filed on Feb. 27, 2012.

(51) Int. Cl.
*H04L 29/06* (2006.01)
*H04L 29/14* (2006.01)

(52) U.S. Cl.
CPC ..... *H04L 29/06027* (2013.01); *H04L 65/1083* (2013.01); *H04L 69/40* (2013.01)

(58) Field of Classification Search
None
See application file for complete search history.

(56) References Cited

U.S. PATENT DOCUMENTS

| | | | |
|---|---|---|---|
| 7,107,054 B2 | 9/2006 | Florkey et al. | |
| 7,123,906 B1* | 10/2006 | Otterbeck | H04M 1/72502 370/352 |
| 7,130,619 B2 | 10/2006 | Florkey et al. | |
| 8,107,957 B1* | 1/2012 | O'Neil | H04M 3/42229 370/352 |
| 8,140,642 B1* | 3/2012 | Kadam et al. | 709/218 |
| 8,149,820 B2* | 4/2012 | Shaheen | 370/352 |
| 8,369,311 B1* | 2/2013 | Kirchhoff | H04M 3/42263 370/352 |
| 8,855,107 B1* | 10/2014 | Kirchhoff et al. | 370/352 |

(Continued)

FOREIGN PATENT DOCUMENTS

| | | |
|---|---|---|
| EP | 1838121 A1 | 9/2007 |
| GB | 2464748 A | 4/2010 |

(Continued)

OTHER PUBLICATIONS

Search Report issued in related application No. GB1303442.6 on Jun. 5, 2013.

*Primary Examiner* — Dung B Huynh
(74) *Attorney, Agent, or Firm* — EIP US LLP

(57) ABSTRACT

A method of controlling a communication session is provided. The communication session is established in a telecommunications network between a first communication client of a plurality of communication clients on one or more communication devices associated with a first party and a communication device associated with a second party, the established communication session comprising at least a first communication session leg established between the first communication client and an intermediate node in the telecommunications network. The method includes detecting a loss in connectivity associated with the first communication session leg, and in response to detecting the loss in connectivity, initiating set up of a second communication session leg between an intermediate node in the telecommunications network and at least a second communication client of the plurality of communication clients on one or more communication devices associated with the first party.

23 Claims, 9 Drawing Sheets

(56) References Cited

U.S. PATENT DOCUMENTS

| | | |
|---|---|---|
| 2002/0090947 A1 | 7/2002 | Brooks et al. |
| 2004/0105428 A1* | 6/2004 | Hukkanen ............... 370/352 |
| 2004/0199637 A1* | 10/2004 | Li et al. ............... 709/227 |
| 2005/0159138 A1 | 7/2005 | Florkey et al. |
| 2006/0198360 A1 | 9/2006 | Biage et al. |
| 2006/0205436 A1* | 9/2006 | Liu ............... H04M 3/42314 455/560 |
| 2006/0209805 A1* | 9/2006 | Mahdi et al. ............ 370/352 |
| 2007/0049342 A1* | 3/2007 | Mayer ............... H04M 1/04 455/558 |
| 2007/0064894 A1* | 3/2007 | Armstrong et al. ..... 379/142.07 |
| 2007/0293212 A1* | 12/2007 | Quon et al. ............ 455/420 |
| 2008/0200166 A1* | 8/2008 | McCamon ........... H04W 48/16 455/426.1 |
| 2009/0116443 A1* | 5/2009 | Walker et al. ............ 370/329 |
| 2009/0215438 A1* | 8/2009 | Mittal ............... H04M 3/42195 455/418 |
| 2009/0245180 A1* | 10/2009 | Wu ............... H04L 65/1083 370/328 |
| 2010/0082810 A1* | 4/2010 | Patel et al. ............ 709/225 |
| 2010/0151845 A1* | 6/2010 | Rountree ........... H04M 3/42263 455/417 |
| 2010/0189094 A1* | 7/2010 | Gray ............... H04L 12/66 370/352 |
| 2010/0195641 A1* | 8/2010 | Tsai ............... 370/352 |
| 2010/0228780 A1* | 9/2010 | Yap et al. ............ 707/784 |
| 2010/0260173 A1* | 10/2010 | Johnson ........... H04M 3/42246 370/356 |
| 2010/0299223 A1* | 11/2010 | Crouch ............... 705/26.3 |
| 2010/0317338 A1* | 12/2010 | Ohsawa ........... H04M 3/42246 455/422.1 |
| 2011/0021937 A1* | 1/2011 | Hugh et al. ............ 600/523 |
| 2011/0122864 A1* | 5/2011 | Cherifi et al. ............ 370/352 |
| 2011/0173331 A1* | 7/2011 | Setton et al. ............ 709/227 |
| 2011/0280239 A1* | 11/2011 | Tung ............... H04M 3/42246 370/352 |
| 2012/0057565 A1* | 3/2012 | Mani ............... H04W 76/041 370/331 |
| 2012/0106728 A1* | 5/2012 | Ghaffari ........... H04M 3/42272 379/211.02 |
| 2012/0157112 A1* | 6/2012 | Erb ............... H04M 3/42153 455/456.1 |
| 2012/0220300 A1* | 8/2012 | Zou ............... H04W 36/0011 455/436 |
| 2013/0230157 A1* | 9/2013 | Mairs ............... H04M 7/0057 379/93.01 |

FOREIGN PATENT DOCUMENTS

| | | |
|---|---|---|
| WO | 20091067172 A1 | 5/2009 |
| WO | 2010/039565 A2 | 4/2010 |
| WO | 20111082181 A1 | 7/2011 |

* cited by examiner

METHODS AND SYSTEMS FOR CONTROLLING A COMMUNICATION SESSION

CROSS-REFERENCE TO RELATED APPLICATIONS

This application claims priority to U.S. Patent Application Ser. No. 61/603,871, entitled "Communication System," filed on Feb. 27, 2012, the content of which is incorporated herein by reference in its entirety.

TECHNICAL FIELD

The present invention relates to controlling communication sessions in telecommunications networks, and in particular to maintaining an established communication session despite experiencing a loss in connectivity.

BACKGROUND

Telephony users have long had to deal with a proliferation of user devices (sometimes referred to as 'user equipment' or 'endpoints') through which third parties may contact them. For example, a user might have a fixed-line (or 'wireline') telephony user device for use at home, a further fixed-line telephony user device for use in the office, and a mobile telephony user device for use whilst on the move. Each type of telephony device has associated advantages; whilst a mobile telephony device provides the user with mobility, a fixed-line telephony device can provide more reliable communications with no battery recharge concerns.

Users may also have a number of different access technologies available through which their telephony user devices may conduct communications. For example, a telephony user device may be equipped with a circuit-switched communication interface and one or more circuit-switched communication clients for conducting communications via suitable circuit-switched networks. Likewise, a telephony user device may also/alternatively be equipped with a packet-switched communication interface and one or more packet-switched communication clients for communicating via suitable packet-switched networks.

A circuit-switched telephony device may comprise a fixed-line Plain Old Telephone Service (POTS) telephone equipped with a circuit-switched interface and communication client for conducting communications via a Public Switched Telephone Network (PSTN). A circuit-switched telephony user device may comprise a mobile (or 'cellular') telephone equipped with a wireless circuit-switched interface and communication client for conducting communications via a cellular network such as a Global System for Mobile Communications (GSM) network or Code Division Multiple Access (CDMA) network.

More recently, packet-switched telephony devices have proliferated which may take the form of a fixed-line Internet Protocol (IP) telephone equipped with a fixed-line packet-switched interface and communication client for communicating via an Internet Protocol (IP) network, such as the internet or an IP Private Branch Exchange (IP-PBX). Similarly, a user may conduct communications via a personal computer (PC) equipped with a packet-switched communication client for conducting communications over the internet via a fixed-line internet connection. A mobile packet-switched telephony device may take the form of a portable computing device, such as a laptop or tablet, equipped with a wireless packet-switched interface and communication client for communicating via an IP network, such as the internet, using a WiFi™ or Bluetooth™ compliant wireless access point. A packet-switched communication client may conduct communications according to an internet telephony protocol, commonly referred to as Voice over Internet Protocol (VoIP), with associated setup and/or control protocols such as the Session Initiation Protocol (SIP) or H.323.

Increasingly, telephony user devices are available that are equipped with multiple communication interfaces to facilitate communication via multiple access technologies. For example, a modern "smartphone" is typically equipped with a circuit-switched interface for communicating via a cellular network and a packet-switched interface for communicating via the internet. Commonly, a smartphone may be equipped with several packet-switched interfaces, for example, a short-range radio interface, e.g. WiFi or Bluetooth™ compliant, and/or or via an interface for communication of packet data through a cellular network, such as 3rd Generation Partnership Project (3GPP) Long Term Evolution (LTE), LTE-Advanced (LTE-A), High Speed Packet Access (HSPA), Wideband Code Division Multiple Access (W-CDMA) or Mobile WiMax etc. In such cases, a packet-switched communication client may also be deployed for conducting communications via one or more of the available wireless packet-switched interfaces. In cases such as this where a device is equipped with more than one communication client, the various clients deployed in that device are referred to as co-located. A suitable packet-switched communication client may be deployed on a user equipment prior to sale, or could be deployed subsequently through an application distribution portal such as the Apple® App Store$^{SM}$ or Android™ Market etc.

To avoid confusing calling parties with identifiers such as telephone dialling numbers for each of the various communication clients of a user, a one-telephone dialling number telephony service allows the user to publish a single telephone dialling number on which they can be contacted. Using a simultaneous ringing service, when the single telephone dialling number is called, more than one of the user's communication clients will ring simultaneously. The user is then able to answer the call using the communication client of his choosing.

However, conventional systems provide a poor user experience in circumstances where the user's communication client experiences a loss of connectivity during an established communication session. It would therefore be desirable to provide improved methods, systems and apparatus for conducting communications in such a telecommunications system.

SUMMARY

In accordance with one aspect of the present disclosure, there is provided a method of controlling a communication session established in a telecommunications network between a first communication client of a plurality of communication clients on one or more communication devices associated with a first party and a communication device associated with a second party, the established communication session comprising at least a first communication session leg established between the first communication client and an intermediate node in the telecommunications network, the method comprising:
  detecting a loss in connectivity associated with the first communication session leg; and
  in response to detecting the loss in connectivity, initiating set up of a second communication session leg between an intermediate node in the telecommunications network and at least a second communication client of the plurality of communication clients on one or more communication devices associated with the first party.

In accordance with a second aspect of the present disclosure, there is provided apparatus for use in controlling a communication session established in a telecommunications network between a first communication client of a plurality of communication clients on one or more communication devices associated with a first party and a communication device associated with a second party, the established communication session comprising at least a first communication session leg established between the first communication client and an intermediate node in the telecommunications network, the apparatus comprising a processing system adapted to:

detect a loss in connectivity associated with the first communication session leg; and in response to detecting the loss in connectivity, initiate set up of a second communication session leg between an intermediate node in the telecommunications network and at least a second communication client of the plurality of communication clients on one or more communication devices associated with the first party.

In accordance with a third aspect of the present disclosure, there is provided a computer program product comprising a non-transitory computer-readable storage medium having computer readable instructions stored thereon, the computer readable instructions being executable by a computerized device to cause the computerized device to perform a method of controlling a communication session established in a telecommunications network between a first communication client of a plurality of communication clients on one or more communication devices associated with a first party and a communication device associated with a second party, the established communication session comprising at least a first communication session leg established between the first communication client and an intermediate node in the telecommunications network, the method comprising:

detecting a loss in connectivity associated with the first communication session leg; and in response to detecting the loss in connectivity, initiating set up of a second communication session leg between an intermediate node in the telecommunications network and at least a second communication client of the plurality of communication clients on one or more communication devices associated with the first party.

In accordance with a fourth aspect of the present disclosure, there is provided a method of controlling a communication session established in a telecommunications network between a first communication client on a first communication device associated with a first party and a second communication device associated with a second party, the established communication session comprising at least a first communication session leg established between the first communication client and a node in the telecommunications network, the method comprising, at the first communication device:

detecting a loss in connectivity associated with the first communication session leg;

receiving a subsequent communication session setup request directed to a second communication client on the first communication device;

determining that the subsequent communication session setup request relates to the established communication session; and in response to determining that the subsequent communication session setup request relates to the established communication session, transmitting a communication session acceptance message from the second communication client.

Further features and advantages of the invention will become apparent from the following description of preferred embodiments of the invention, given by way of example only, which is made with reference to the accompanying drawings.

DETAILED DESCRIPTION

Figure 1:
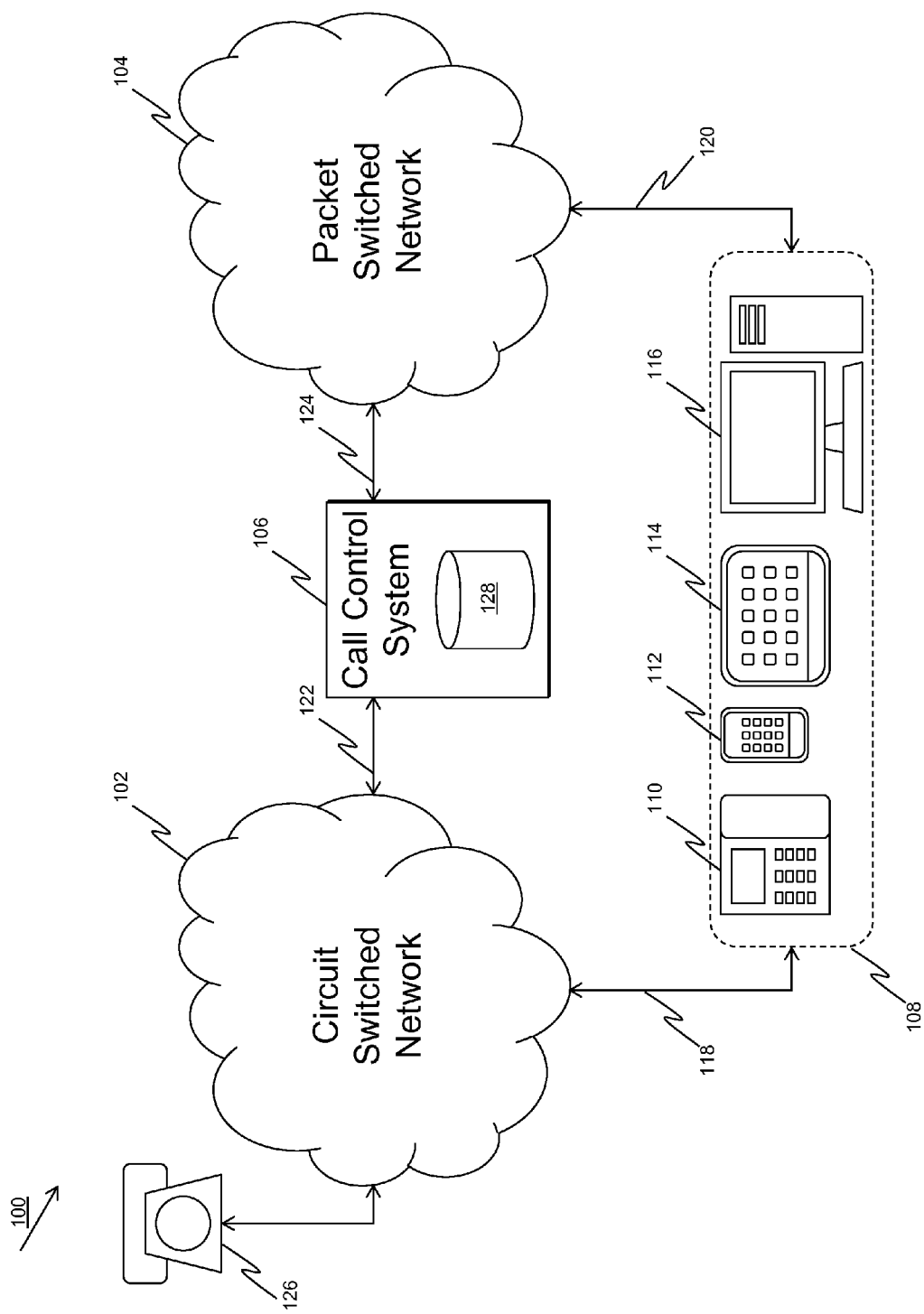
FIG. 1 shows an exemplary telecommunications network in which embodiments of the present disclosure can be employed.

FIG. 1 shows an exemplary telecommunications network 100 in which embodiments of the present disclosure can be employed. Telecommunications network 100 includes a circuit-switched telecommunications network part 102, a packet-switched network part 104 and may include other network parts (not shown). According to embodiments, a client-shared telephony service is hosted and controlled by a call control system 106.

A user of the client-shared telephony service may have a number of communication devices 108 through which they may conduct communications via the service. The various communication devices 108 through which a user can conduct communications via the service are considered to be associated with that user. The user's associated communication devices 108 may include, for example, desk phone 110, mobile (or 'cellular') telephone 112, tablet 114 and/or personal computer 116.

Each of the user's communication devices is equipped with one or more interfaces and one or more communication clients for conducting communications in telecommunications network 100. Communication devices equipped with a circuit-switched interface and communication client are adapted to conduct communications in telecommunications network 100 via link 118 with circuit-switched network 102. The circuit-switched interface may comprise a landline PSTN interface in the case of a fixed-line device such as desk phone 110, or a cellular radio telephony interface in the case of a mobile device such as mobile telephone 112. Communication devices equipped with a packet-switched interface and communications client are adapted to conduct communications in telecommunications network via link 120 with packet-switched network 104. This packet-switched interface could comprise a wired interface to the internet in the case of a fixed line device such as personal computer 116, or a wireless interface (e.g. WiFi, Bluetooth, 3G-LTE, WiMax, etc.) to the internet in the case of a mobile device such as tablet 114. The packet-switched interface may comprise an Ethernet part.

Some communication devices may be equipped with multiple communication clients. For example, in addition to the aforementioned circuit-switched communication client and associated interface, mobile telephone 112 may also be equipped with one or more packet-switched communications clients and interfaces for conducting communications with packet-switched network 104 via link 120. In this case, the multiple communication clients equipped on mobile telephone 112 are referred to as co-located communication clients, i.e. multiple communication clients on a single device.

Call control system 106 comprises a user database 128 for storing data associated with users of the client-shared telephony service. Although depicted in FIG. 1 as a single network entity located in-between circuit-switched network part 102 and packet-switched network part 104, call control system 106 may comprise a plurality of network entities, with elements located within circuit-switched network part 102 and/or packet-switched network part 104 or one or more other networks (not shown). In some embodiments, user database 128 includes a list of identifiers for the communication clients equipped to the various communication devices 108 associated with a given user. User database 128 may also store a user profile associated with each user, which contains a number of user configurable preferences, such as call routing preferences.

Each of the communication clients equipped to the various communication devices 108 associated with a given user are likely to have intermittent connectivity to call control system 106, and therefore are only intermittently able to conduct communications. This may be due to the devices being powered off for limited periods. Alternatively this may be due to mobility when connecting to telecommunications network 100 via a wireless interface, for example by moving in and out of range of the various cells and access points or interference from other wireless communication equipment etc. Further, there could be temporary problems with local or centralised network infrastructure in telecommunications network 100, such as downtime due to maintenance work or power outages.

From the perspective of call control system 106, the communication clients on the various communication devices 108 associated with a given user can be considered to have intermittent availability. According to embodiments, user database 128 is further configured to store the availability of any clients associated with a given user. According to some embodiments, this is achieved by configuring each communication client to periodically send a message (referred to herein as a heartbeat message) to call control system 106. If such a heartbeat message is not received by call control system 106, that client can be considered unavailable until a subsequent message is successfully received. Alternatively, in other embodiments, call control system 108 is adapted to periodically "poll" each communication client to probe for its availability using a request response protocol.

A communication session between a communication client on one of the user's devices 108 and a communication client on a device of a remote party 126 can be routed between circuit-switched network 102 and call control system 106 via link 122. Link 122 may for example comprise a SIP trunk, or other high capacity communications link. Similarly, communication sessions can be routed between packet-switched network 104 and call control system 106 via link 124. Link 122 and/or link 124 may comprise one or more gateway or session border controller entities (not shown) which carry out conversion between the various protocols and data formats used to transfer media data and signalling data in the different networks making up telecommunications network 100. For example, a media gateway (not shown) may convert between the different protocols of media data passing between circuit-switched network 102 and packet-switched network 104, such as packetised Voice over Internet Protocol (VoIP) data into Time-Division-Multiplexing (TDM) voice data and vice versa. A signalling gateway (not shown) may convert between the different protocols of signalling information passing between circuit-switched network 102 and packet-switched network 104, such as SIP, Signalling System 7 (SS7), Integrated Services Digital Network User Part (ISUP), American National Standards Institute (ANSI)-41, Mobile Application Part (MAP) formats, etc.

In order to provide the client-shared telephony service, circuit-switched network 102 is configured to route communication sessions between the user's devices 108 and a remote party device 126 via call control system 106. Call control system 106 may comprise a media gateway controller, service platform, call agent, application server or softswitch and may perform other functions typically associated with such entities.

Figure 2:
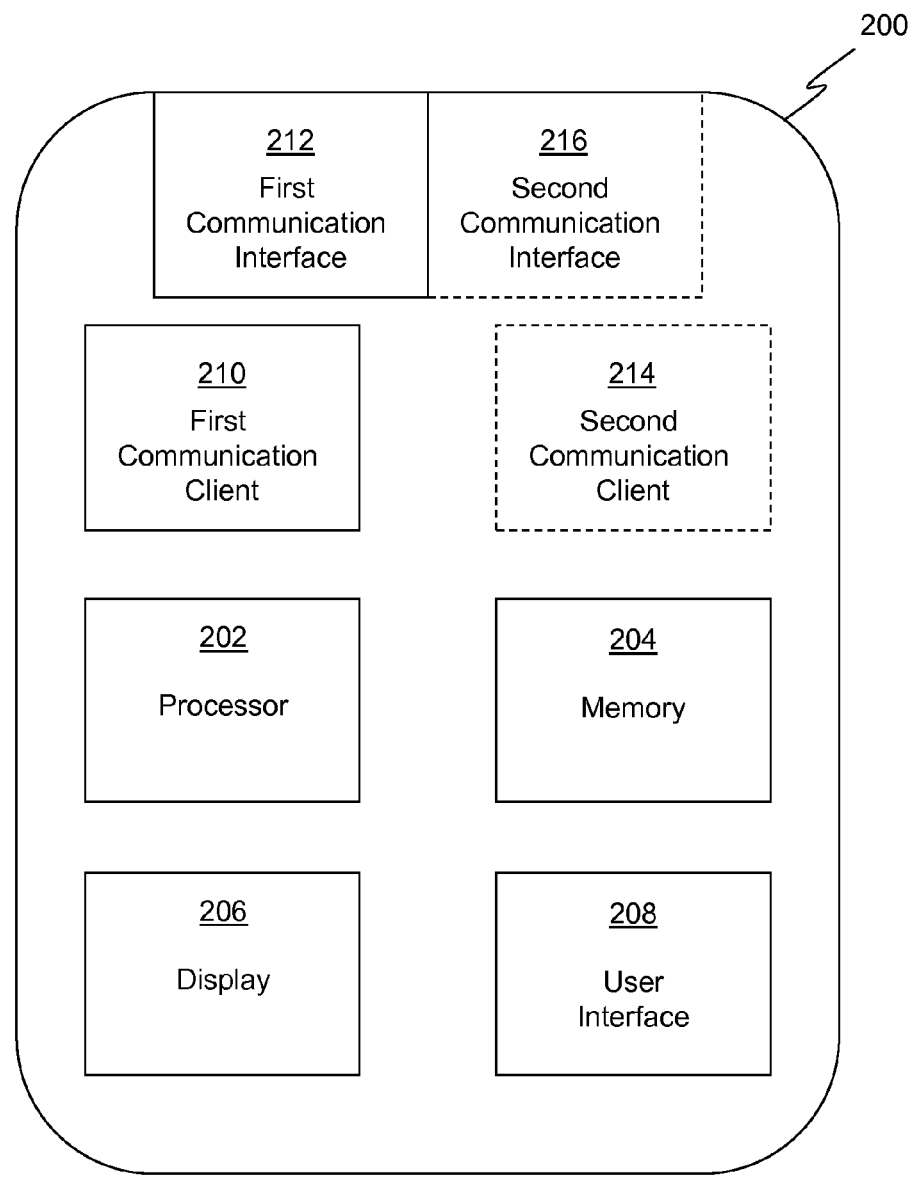
FIG. 2 shows an exemplary communication device adapted to conduct communication sessions such as voice calls in the telecommunication network according to embodiments.

FIG. 2 shows an exemplary communication device 200 adapted to conduct communication sessions such as voice calls in telecommunication network 100 according to embodiments. Communication device 200 may for example comprise mobile telephone 112 depicted in FIG. 1.

Communication device 200 comprises a processor 202 for carrying out data processing tasks of embodiments. Communication device 200 comprises a memory 204 for storing data associated with embodiments. Communication device 200 comprises a user interface 206 for collecting user input from a user of the device, including user input associated with setting up and acceptance of communication sessions, such as telephone dialling number digits or incoming call acceptance or rejection commands. In embodiments, communication device 200 also comprises a display 206. In some embodiments, user interface 206 may comprise a touch-screen layer overlaying display 206, upon which one or more touch-sensitive screen regions (or 'buttons') are configurable by processor 202.

Communication device 200 comprises a first communication client 210 adapted to communicate via a first part of telecommunications network 100 via a first communication interface 212. In some embodiments, first communication client 210 comprises a circuit-switched communication client adapted to communicate via a circuit-switched part 102 of telecommunications network 100. In such embodiments, first communication interface 212 is a circuit-switched communication interface.

In some embodiments, communication device 200 also comprises a second communication client 214 adapted to communicate via a second, different part of telecommunications network 100 via a second communication interface 216. In such embodiments, first communication client 210 and second communication client 214 are described as being co-located on communication device 200. In some embodiments, second communication client 214 comprises a packet-switched communication client adapted to communicate via a packet-switched part 104 of telecommunications network 100. In some such embodiments, second communication interface 216 is a packet-switched communication interface.

In some alternative embodiments, first communication client 210 and second communication client 214 are both packet-switched clients, adapted to communicate via a packet-switched part of telecommunications network 100. In further alternative embodiments, first communication client 210 and second communication client 214 are both circuit-switched clients, adapted to communicate via a circuit-switched part of telecommunications network 100.

In embodiments, first communication interface 212 and second communication interface 216 comprise one or more antennae for wireless radio communication, which may be shared between first communication interface 212 and second communication interface 216. In some such embodiments, first communication interface 212 and second communication interface 216 comprise a cellular radio modem and a non-cellular radio modem respectively.

In alternative embodiments, first communication interface 212 and second communication interface 216 comprise one or more hardware ports for fixed-line communication. In some such embodiments, first communication interface 212 comprises a PSTN port. In some such embodiments, second communication interface 216 comprises an Ethernet port.

Operation of the client-shared telephony service in telecommunications network 100 will now be described in relation to FIG. 3.

Figure 3:
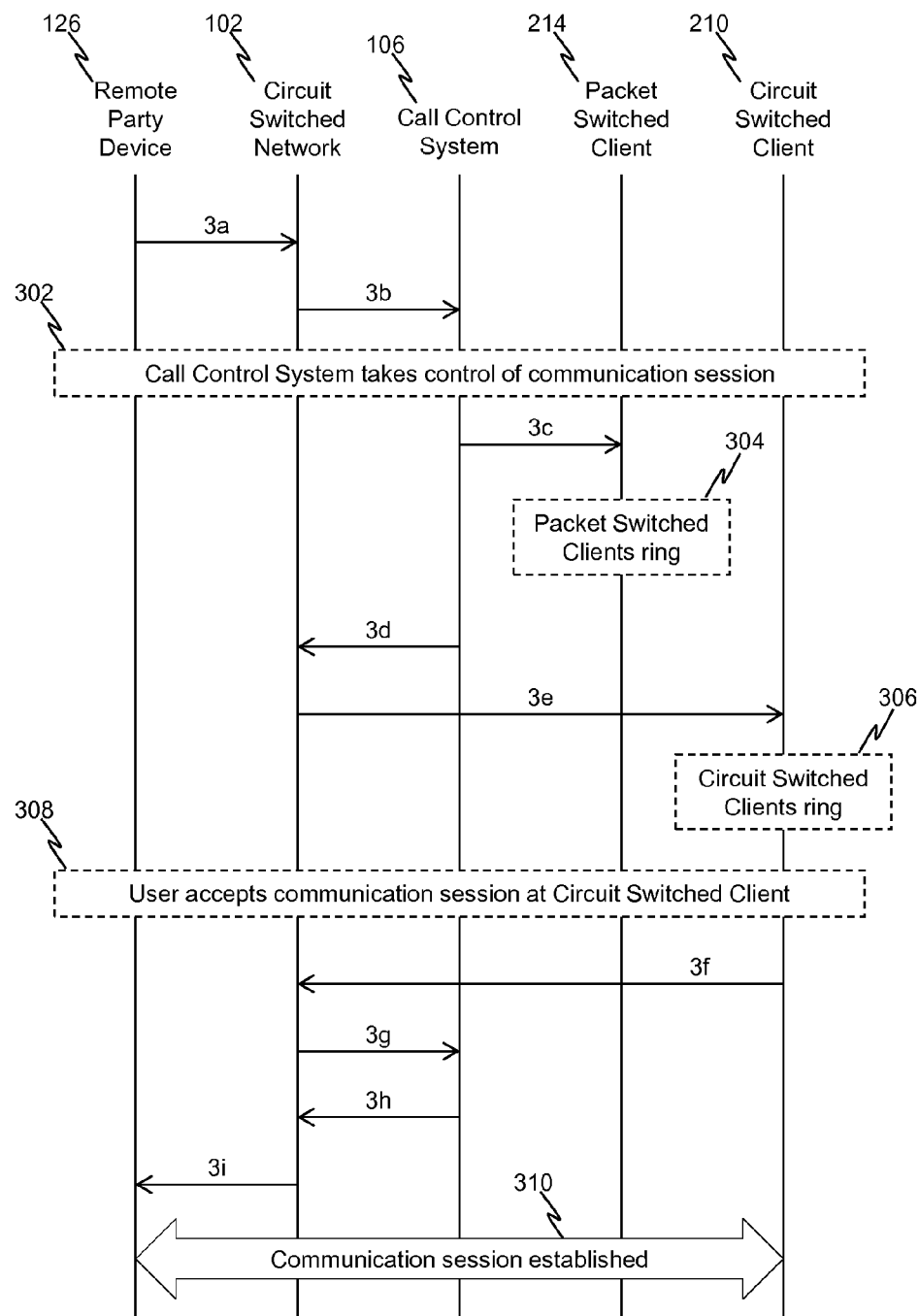
FIG. 3 shows a signalling message flow diagram describing the operation of the telecommunications network for providing a client-shared telephony service according to embodiments.

FIG. 3 shows a signalling message flow diagram describing the operation of telecommunications network 100 of FIG. 1 for providing a client-shared telephony service according to embodiments. In the embodiments shown in FIG. 3, the user's communication clients include a number of circuit-switched clients, including at least circuit-switched client 210 and a number of packet-switched clients, including at least packet-switched client 214. Circuit-switched client 210 and packet-switched client 214 may be equipped to different communication devices, or to the same communication device as shown in relation to FIG. 2.

At step 3a, a communication session setup request to the client-shared dialling number is transmitted by a communication client on remote party device 126. The communication setup request of step 3a may pass through a number of further entities or network parts (not shown) between remote party device 126 and circuit-switched network 102, such as one or more telephone switches. Circuit-switched network 102 has been configured to route communication session signalling data relating to the client-shared dialling number to call control system 106, and contacts call control system 106 with appropriate communication session signalling data accordingly in step 3b. Upon receipt of the communication session signalling data of step 3b, call control system 106 takes control of the communication session, as shown by item 302.

At step 3c, call control system 106 transmits communication session setup requests to the user's one or more packet-switched communication clients, including at least packet-switched communication client 214, via packet-switched network 104. Upon receipt of such communication session setup requests, the user's packet-switched communication clients will, unless unavailable, alert the user as to the request for incoming communication as shown by item 304. Such alert will involve activating one or more alert functions on the appropriate device, such as ring and/or vibrate functions. Similarly, at step 3d, call control system 106 transmits communication session setup requests via circuit-switched network 102 to the user's one or more circuit-switched clients, including at least circuit-switched communication client 210, in step 3e. Upon receipt of such communication session setup requests, the user's circuit-switched communication clients will, unless unavailable, alert the user accordingly, as shown by item 306.

The result of steps 3a to 3e is that all of the user's (available) communication clients will ring, allowing the user to select at which communication client (and therefore via which associated access technology) on which device to accept the received communication session setup request and hence conduct a communication session on.

In the embodiments depicted in FIG. 3, the user accepts the communication session setup request at circuit-switched communication client 210, at step 308, by entering appropriate user input e.g. by pressing an answer key via a user interface on the device on which circuit-switched communication client 210 is deployed. This results in a communication session setup response message (in this case an acceptance message) being transmitted from circuit-switched communication client 210 back to call control system 106 via circuit-switched network 102, as shown by steps 3f and 3g. Call control system 106 then transmits a communication session setup response (acceptance) message back to remote party device 126 via circuit-switched network 102, as shown by steps 3h and 3i. Having completed the end-to-end communication session setup signalling flow, a communication session is established between remote party device 126 and circuit-switched communication client 212 as shown by item 310.

Note that in the embodiments depicted in FIG. 3, the user chose to accept the communication session setup request such that an acceptance response message was generated by the user communication client in question. If the user had chosen to reject the communication session setup request, then the user communication client in question would have generated a rejection response message and a communication session would not have been established with remote party device 126.

In the embodiments depicted in FIG. 3, all of the user's available devices were caused to ring. However, in alternative embodiments, the user may have configured a number of call initiating preferences for defining complex ringing scenarios, which might, for example, define a subset of a user's communication clients which should be used to initiate calls to under specific conditions. These user configurable preferences may also be stored in user database 128 as part of the user profile for each user. For example, a user may wish to configure their user preferences such that calls are not initiated to their desk phone at the office if it is later than 6 pm or during the weekend, or that calls are not initiated to their home phone between 9 am and 7 pm on weekdays.

Communication session setup requests can be directed to a specific user client in a number of ways. According to some embodiments, the communication session setup requests can be routed to a client on the basis of the unique identifier for that client. According to other embodiments, the communication session setup request is transmitted to all of a user's clients, but with the identifiers of the targeted clients included as an additional parameter. In these embodiments, when a client receives the communication session setup request, it checks its own identifier against the included identifiers in the additional parameter, and only alerts the user to the communication session setup request if there is a matching identifier.

In embodiments, established communication session 310 consists of multiple communication session legs. A communication session leg is a subset of the established communication session that spans only a part of a communication session path. For example, communication session 310 may comprise one communication session leg between remote party device 126 and call control system 106, and another communication session leg between call control system 106 and a user communication client 108. This allows call control system 106 to maintain its presence on the communication session path and provide additional features or call services if required. Each of the communication session legs between call control system 106 and the remote party device communication client may actually be subdivided into a number of further legs, but will be discussed henceforth as a single leg for the sake of simplicity. Further, the communication session legs need not connect to the same node in call control system 106 and may be bridged by one or more further legs in order to provide the required end-to-end communications.

Figure 4:
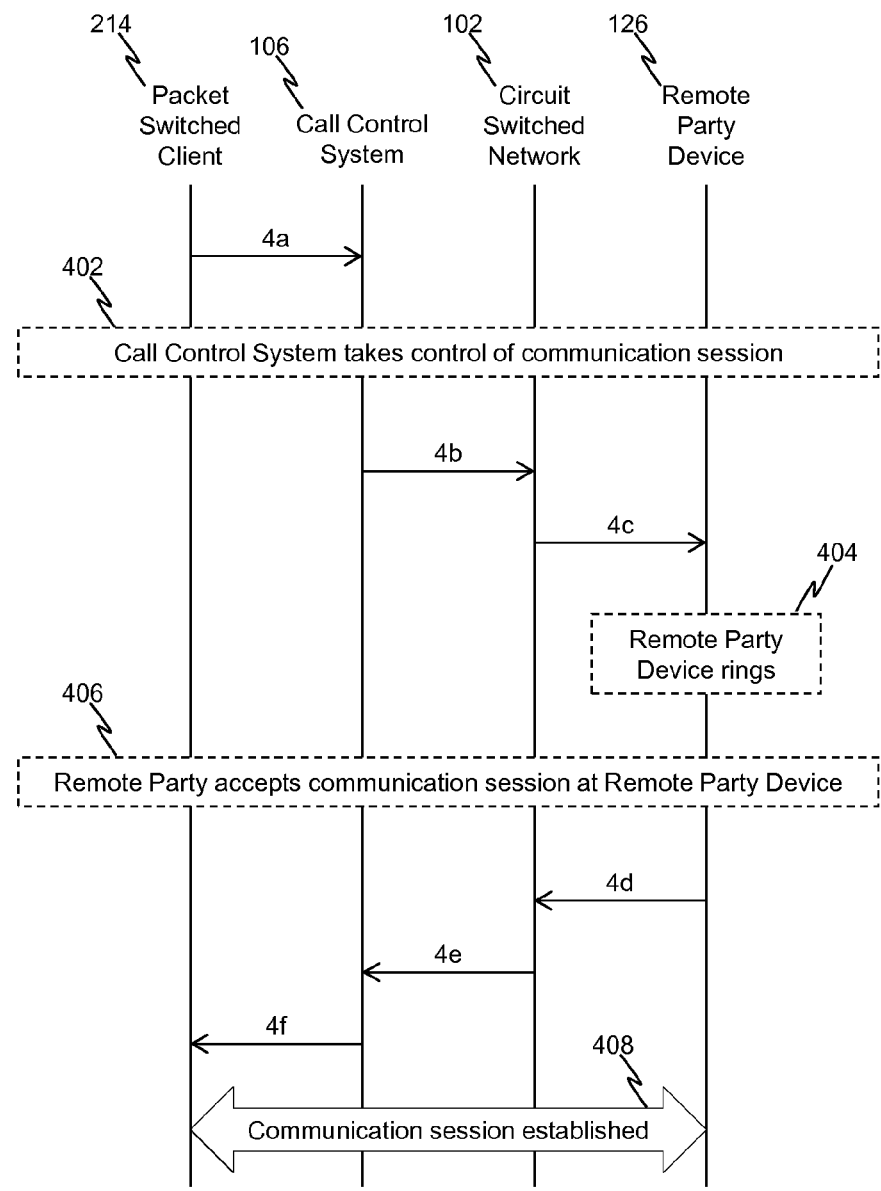
FIG. 4 shows a signalling message flow diagram describing the operation of the telecommunications network for providing a client-shared telephony service according to further embodiments.

FIG. 4 shows a signalling message flow diagram describing the operation of telecommunications network 100 of FIG. 1 for placing a call from a packet-switched client of the client-shared telephony service according to embodiments. In the embodiments shown in FIG. 4, the user has a number of communication clients, including at least packet-switched client 214.

At step 4a, a communication session setup request, directed to a communication client on remote party device 126, is transmitted from a packet-switched client 214, located on a device associated with a user of the client-shared telephony service, to call control system 106 via packet-switched network 104. Upon receipt of the communication session setup request of step 4a, call control system 106 takes control of the communication session, as shown by item 402.

Having taken control of the communication session, call control system 106 transmits a communication session setup request to the communication client on remote party device 126 via circuit-switched network 102, as shown by steps 4b and 4c. The communication setup request of step 4c may pass through a number of further entities or network parts (not shown) between remote party device 126 and circuit-switched network 102, such as one or more telephone switches.

Upon receipt of the communication session setup request, the communication client on remote party device 126 will alert the remote party as to the request for incoming communication as shown by item 404. In the embodiment of FIG. 3, the remote party accepts the communication session setup request at step 406. This results in the transmission of a communication session setup response message (in this case an acceptance response message) being transmitted from the communication client on remote party device 126, back to circuit-switched network 102, in step 4d. Circuit-switched network 102 has been configured to route communication session signalling data relating to the client-shared dialling number to call control system 106, and contacts call control system 106 with appropriate communication session signalling data accordingly in step 4e.

Upon receipt of the communication session signalling data of step 4e, call control system 106 then transmits a communication session setup response (acceptance) message back to packet-switched client 214 via packet-switched network 102, as shown by step 4f. Having completed the end-to-end communication session setup signalling flow, a communication session is established between packet-switched communication client 214 and remote party device 126, as shown by item 408.

Note that in the embodiments depicted in FIG. 4, the remote party chose to accept the communication session setup request such that an acceptance response message was generated by the communication client on remote party device 126. If the remote party had chosen to reject the communication session setup request, then the communication client on the remote party device would have generated a rejection response message and a communication session would not have been established.

Figure 5:
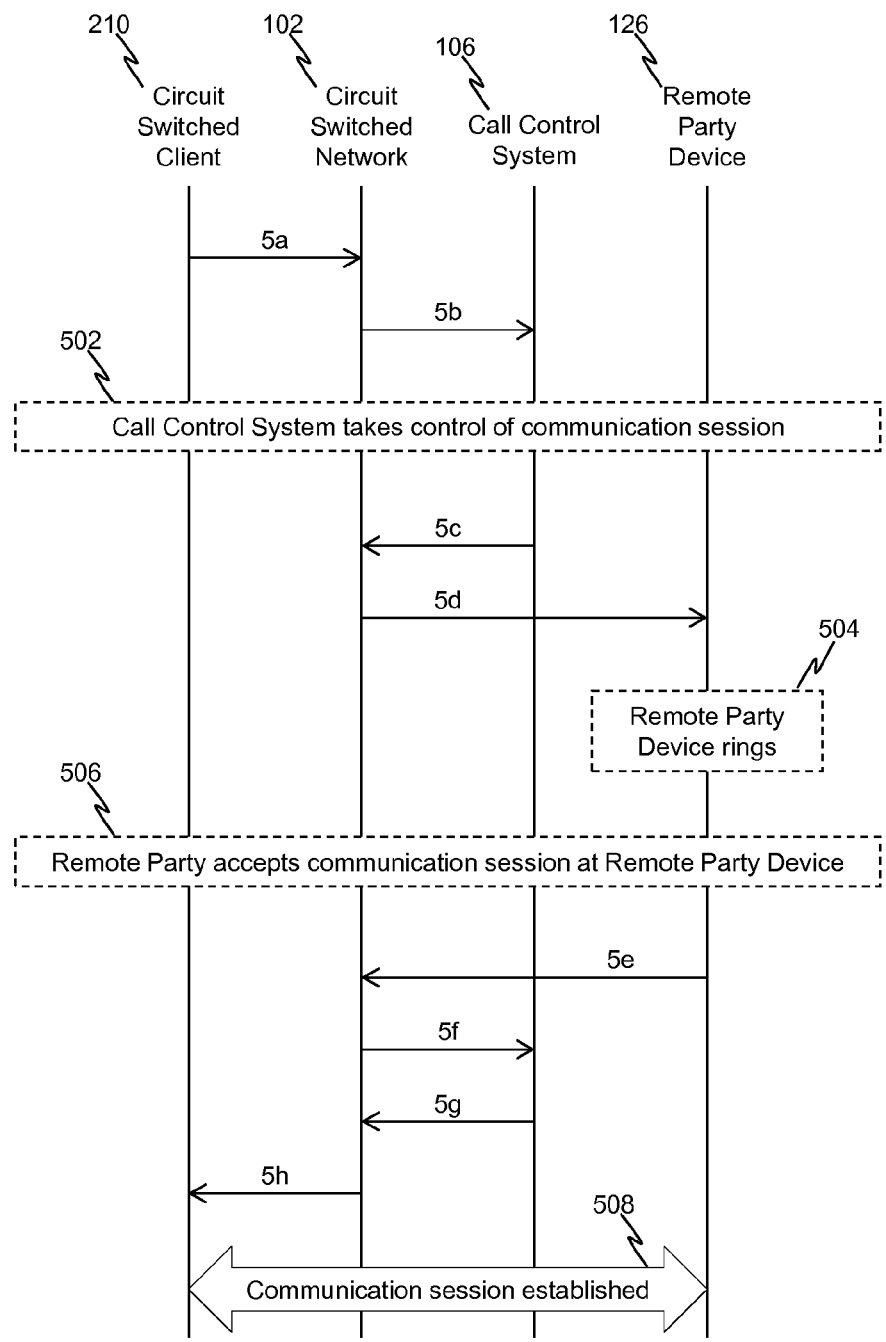
FIG. 5 shows a signalling message flow diagram describing the operation of the telecommunications network for providing a client-shared telephony service according to yet further embodiments.

FIG. 5 shows a signalling message flow diagram describing the operation of telecommunications network 100 of FIG. 1 for placing a call from a circuit-switched client of the client-shared telephony service according to embodiments. In the embodiments shown in FIG. 5, the user has a number of communication clients, including at least circuit-switched client 210.

At step 5a, a communication session setup request, directed to a communication client on remote party device 126, is transmitted from a circuit-switched client 210, located on a device associated with a user of the client-shared telephony service. Circuit-switched network 102 has been configured to route communication session signalling data relating to the client-shared dialling number to call control system 106, and contacts call control system 106 with appropriate communication session signalling data accordingly in step 5b. Upon receipt of the communication session signalling data of step 5b, call control system 106 takes control of the communication session, as shown by item 502.

Having taken control of the communication session, call control system 106 transmits communication session setup requests via circuit-switched network 102 to the communication client on remote party device 126 via circuit-switched network 102, as shown by steps 5c and 5d. The communication setup request of step 5d may pass through a number of further entities or network parts (not shown) between remote party device 126 and circuit-switched network 102, such as one or more telephone switches.

Upon receipt of the communication session setup request, the communication client on remote party device 126 will alert the remote party as to the request for incoming communication as shown by item 504. In the embodiment of FIG. 5, the remote party accepts the communication session setup request at step 506. This results in the transmission of a communication session setup response message (in this case an acceptance response message) being transmitted from the communication client on remote party device 126, back to circuit-switched network 102, in step 5e. Circuit-switched network 102 has been configured to route communication session signalling data relating to the client-shared dialling number to call control system 106, and contacts call control system 106 with appropriate communication session signalling data accordingly in step 5f.

Upon receipt of the communication session signalling data of step 5*e*, call control system 106 then transmits a communication session setup response (acceptance) message back to circuit-switched client 210 via circuit-switched network 102, as shown by steps 5*g* and 5*h*. Having completed the end-to-end communication session setup signalling flow, a communication session is established between remote party device 126 and the circuit-switched communication client 210, as shown by 508.

As described previously, a number of the user's communication clients may have intermittent ability to conduct communications via telecommunications network 100 (this ability to ability for a communication client to conduct communications is also referred to as a communication client's availability). Should a communication client experience a loss in connectivity whilst it is involved in a communication session this is likely to have a negative effect on the user experience of the communicating parties. Such a loss in connectivity might comprise a partial data loss, which is likely to result in media quality degradation, or a complete data loss, which would result in total media loss and might conventionally result in the communication session being torn down. Both of these types of connectivity loss provide a clearly undesirable user experience.

Advantageously, the present disclosure provides a number of systems and methods for handling a loss in connectivity in such a way as to provide a more desirable user experience. Embodiments of the present disclosure enable an established communication session between a communication client associated with a user of a client-shared telephony service and a communication client associated with a remote party to be maintained, despite the user's communication client experiencing a loss in connectivity. Operation of such embodiments of the present disclosure will now be described in relation to FIG. 6.

Figure 6:
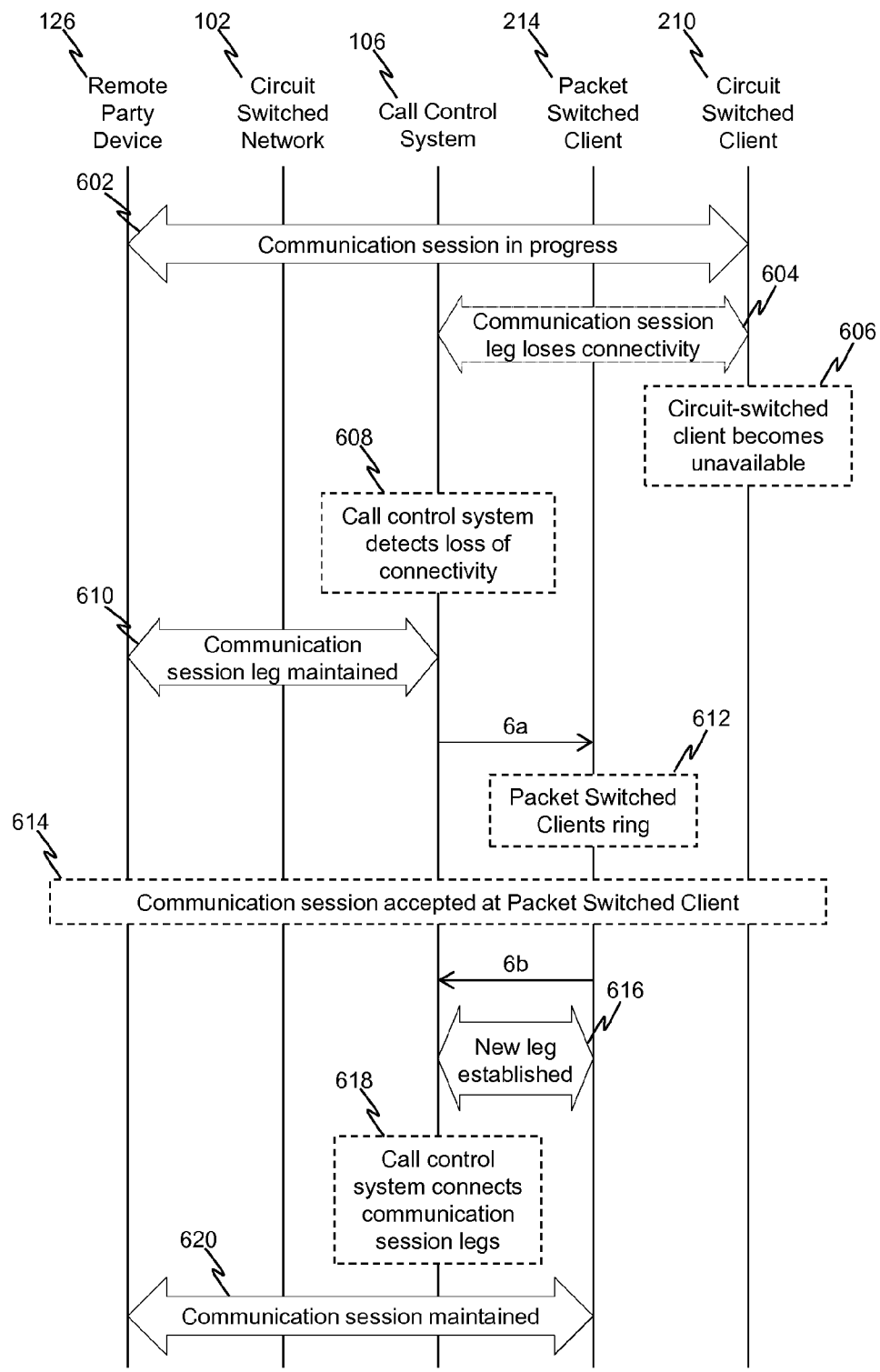
FIG. 6 shows a signalling message flow diagram describing the operation of the telecommunications network for controlling an established communication session according to embodiments.

FIG. 6 shows a signalling message flow diagram describing the operation of telecommunications network 100 of FIG. 1 for controlling an established communication session between a communication client on remote party device 126 and one of a plurality of communication clients on one or more communication devices 108 associated with a user of the client-shared telephony service. According to the embodiments shown in FIG. 6, at the start of the signalling message flow diagram there is an established communication session in progress between remote party device 126 and a circuit-switched client 210 on one of the one or more communication devices 108 associated with the user, as shown by 602.

The established communication session comprises a number of communication session legs, including a communication session leg between circuit-switched client 210 and an intermediate node in the telecommunications network, and a communication session leg between remote party device 126 and an intermediate node in the telecommunications network. According to the embodiments shown in FIG. 6, the, or each, intermediate node is represented by, or within, call control system 106 (and may correspond to one or more of the different entities comprised therein). As described in relation to FIG. 1, the entities comprised by call control system 106 may be located within circuit-switched network part 102 and/or packet-switched network part 104 or one or more other networks (not shown).

While the established communication session is in progress, the communication session leg between circuit-switched client 210 and the corresponding intermediate node experiences a loss in connectivity as shown by 604. The result of this loss of connectivity is that circuit-switched client 210 becomes unavailable for conducting communications via telecommunications network 100, as shown by 606. At 608, call control system 106 detects this loss in connectivity, for example as a result of receiving degraded signalling or media data from circuit-switched client 210. Call control system 106 takes steps to maintain the established communication session leg between remote party device 126 and the corresponding intermediate, as shown by 610. In some embodiments, this comprises generating and transmitting the necessary signalling data to remote party device 126 to prevent the remote device terminating the communication session due to inactivity. In other embodiments this merely comprises refraining from actively tearing down the communication session.

In response to detecting the loss of connectivity, call control system 106 initiates the setup of a further communication session leg between an intermediate node in the telecommunications network and a number of further communication clients on the one or more communication devices 108 associated with the user. In the embodiments shown in FIG. 6, these further communication clients include at least packet-switched communication client 214. Accordingly, call control system 106 transmits communication session setup request 6*a* to packet-switched communication client 214, via packet-switched network 104. Communication session setup requests are also sent to any other further communication clients in parallel (not shown). This result of the preceding steps is that the further communication clients (including at least packet-switched client 214) begin ringing, as shown by step 612, thereby providing the user the opportunity to immediately resume communications at any of their available associated communication clients equipped to their associated device(s) 108.

At step 614, the communication session set up request is accepted by one of the further communication clients on the one or more communication devices 108 associated with the user, e.g. by entering appropriate user input via a user interface on the corresponding communication device. In the embodiments shown in FIG. 6 the communication session is accepted at packet-switched client 214, resulting in the transmittal of communication session acceptance message 6*b* from packet-switched communication client 214 back to call control system 106 via packet-switched network 104.

After receiving communication session acceptance message 6*b*, call control system 106 establishes a new communication session leg between an intermediate node in the telecommunications network and packet-switched client 214, as shown by step 616. This new communication session leg between packet-switched client 214 and the intermediate node is connected to the maintained communication session leg between remote party device 126 and the corresponding intermediate node, as shown by 618. According to some embodiments, this is achieved by establishing the communication session leg between packet-switched client 214 and the intermediate node as a part of the established communication session. According to other embodiments, this requires an additional bridging operation to connect the two communication session legs. The result of connecting the new communication session leg established between packet-switched client 214 and the corresponding intermediate node to the maintained communication session leg established between remote party device 126 and the corresponding intermediate node is to complete an end-to-end communication session between the communication client on remote party device 126 and packet-switched client 214 on a device associated with the user, thereby allowing the remote party and the user to continue conducting communications, as shown by step 620.

In some embodiments, having re-established end-to-end communications between the user and the remote party, call control system 106 may perform the additional step of tearing down any remnants of the communication session leg that suffered from the loss in connectivity (e.g. at step 604), such as closing any open media or signalling connections, purging related state information etc. According to some embodiments, having re-established end-to-end communications between the user and the remote party, call control system 106 may perform the additional step of revoking any communication session setup requests sent to communication clients other than the one that accepted the setup.

Whilst in the embodiments described in FIG. 6 the communication session setup request was accepted at step 614, in alternative embodiments the communication session setup request is not accepted. According to some embodiments, this may be because the user's other communication clients are equipped to devices that that the user does not have to hand, and as a result the user is unable to utilise those communication clients to continue the present communication session. In some such embodiments, call control system 106 continues trying to ring the user's available communication clients until the remote party decides to terminate the communication session. In some such embodiments, call control system 106 only continues trying to ring the user's available communication clients for a predetermined period of time, after which call control system 106 terminates the communication session in order to free up network resources for the processing of other communication sessions.

Alternatively, the communication session setup request might not be accepted because the user has no other available communication clients. In such embodiments, the attempts of call control system 106 to initiate the setup of a further communication session leg will fail. In some such embodiments, in response to the attempts to initiate the setup of a further communication session leg failing, call control system 106 tears down the communication session. In other such embodiments, in response to the attempts to initiate the setup of a further communication session leg failing, call control system 106 continues attempting to initiate the setup of a further communication session leg until the remote party decides to terminate the call. In some such embodiments, call control system 106 only continues attempting to initiate the setup of a further communication session leg for a predetermined period of time, after which call control system 106 terminates the communication session in order to free up network resources for the processing of other communication sessions.

In some embodiments described above, the predetermined period of time is configured by an operator of the call control system. In other such embodiments, the predetermined period of time is configured by the user of the client-shared telephony service, in which case the time period is stored in that user's user profile in user database 128.

While in the embodiments described in relation to FIG. 6, the other clients associated with the user of the client-shared telephony service were caused to ring in response to the communication session setup request, according to further embodiments this could be any kind of alert or notification that the corresponding device is capable of exhibiting, including audio, visual or tactile. This could be configured to be different to the standard alerting behaviour exhibited in response to receiving a communication session setup request for a new communication session, rather than one previously established with another associated communication client, thereby allowing the user to easily differentiate accordingly.

If the communication session setup request is accepted quickly enough, the communication session can continue between the remote party and the user without the impact on the communication session being noticeable to the remote party. However, if not accepted quickly, the interruption in the expected exchange of media data may provide an undesirable experience for the remote party. Hence, according to some embodiments, call control system 106 may, while the communication session leg between remote party device 126 and the corresponding intermediate node in the telecommunications network is being maintained 610, transmit a communication session maintenance notification to remote party device 126 to inform the remote party that an attempt to maintain the communication session is being performed. According to some embodiments, this communication session maintenance notification comprises media data, such as a call hold message or tone, transmitted via the communication session leg being maintained between remote party device 126 and the intermediate node in the telecommunications network. According to some embodiments, this communication session maintenance notification is transmitted immediately upon detection of the loss of connectivity. According to other embodiments, the communication session maintenance notification is transmitted in response to a trigger condition occurring after detection of the loss of connectivity, but before the subsequent communication session leg is established. For example, according to some such embodiments, transmission of the communication session maintenance notification is triggered after the communication session leg has been maintained for a predetermined period of time following the detected loss of connectivity on the other communication session leg, in order to prevent causing a noticeable interruption in an otherwise potentially unnoticeable (to the remote party at least) re-establishment of communications. The predetermined period of time may be measured by a timer which is triggered upon the detection of the loss of connectivity, upon the initiation of the set up of the second communication session leg, or another event occurring before the second communication session leg is established. According to other such embodiments, transmission of the communication session maintenance notification is triggered by another event, such as receiving a response message indicating receipt of the communication session setup request by one of the user's communication clients.

According to some embodiments, if the attempt to setup the subsequent communication session leg fails after the transmission of the communication session maintenance notification, a different message or tone may be transmitted to indicate termination of the communication session.

In the embodiments described in relation to FIG. 6, the communication session was initially established with a circuit-switched client associated with the user, and subsequently re-established with a packet-switched client associated with the user. However, the initial and subsequent communication clients could comprise any combination of circuit and/or packet-switched clients. For example, the communication session may be initially established with a packet-switched communication client, and be subsequently re-established with a circuit-switched communication client. By further example, a communication session initially established with a packet-switched communication client may be subsequently re-established with a further packet-switched communication client, or a communication session initially established with a circuit-switched communication client may be subsequently re-established with a further circuit-switched communication client.

In some scenarios, a wireless circuit-switched (e.g. cellular) client could lose connectivity when entering a building, while a nearby wireless packet-switched client could simultaneously obtain connectivity by virtue of moving within range of that building's WiFi network. Vice-versa, a wireless packet-switched client could lose connectivity when leaving a building by virtue of moving out of range of that building's WiFi network, while a nearby wireless circuit-switched client could gain connectivity as a result of moving outside. Equally a wireless circuit-switched or packet-switched client equipped to a mobile device could lose connectivity by running out of battery or entering an area with no radio signal coverage, while a nearby associated circuit-switched or packet-switched client equipped to a fixed-line device (e.g. at the user's desk) may have connectivity. Operation of some such alternative embodiments of the present disclosure will now be described in relation to FIG. 7.

Figure 7:
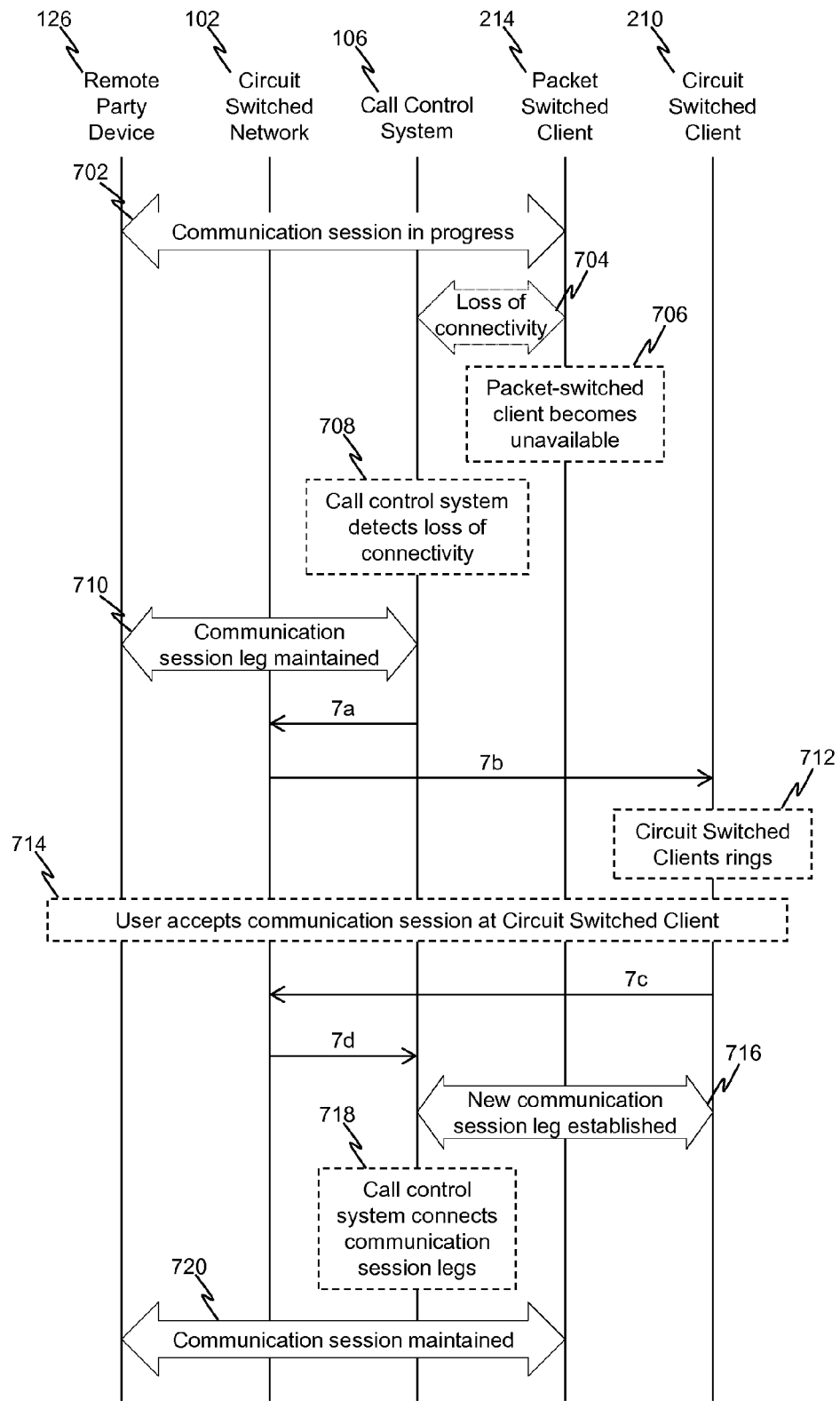
FIG. 7 shows a signalling message flow diagram describing the operation of the telecommunications network for controlling an established communication session according to further embodiments.

FIG. 7 shows a signalling message flow diagram describing the operation of telecommunications network 100 of FIG. 1 for controlling an established communication session between a communication client on remote party device 126 and one of a plurality of communication clients on one or more communication devices 108 associated with a user of the client-shared telephony service. According to the embodiments shown in FIG. 7, at the start of the signalling message flow diagram there is an established communication session in progress between remote party device 126 and a packet-switched client 214 on one of the one or more communication devices 108 associated with the user, as shown by 702.

The established communication session comprises a number of communication session legs, including a communication session leg between packet-switched client 214 and an intermediate node in the telecommunications network, and a communication session leg between remote party device 126 and an intermediate node in the telecommunications network. Whilst the established communication session is in progress, the communication session leg between packet-switched client 214 and the intermediate node in the telecommunications network experiences a loss in connectivity as shown by 704. The result of this loss of connectivity is that packet-switched client 214 becomes unavailable for conducting communications via telecommunications network 100, as shown by 706. At 708, call control system 106 detects this loss in connectivity, and takes steps to maintain the established communication session leg between remote party device 126 and the corresponding intermediate node in the telecommunications network, as shown by 710.

In response to detecting the loss of connectivity, call control system 106 initiates the setup of a further communication session leg between an intermediate node in the telecommunications network and a number of further communication clients on the one or more communication devices 108 associated with the user. In the embodiments shown in FIG. 7, these further communication clients include at least circuit-switched communication client 210. Accordingly, call control system 106 transmits a communication session setup request to circuit-switched communication client 210, via circuit-switched network 102, as shown by 7a and 7b. Communication session setup requests are also sent to any other further communication clients in parallel (not shown). This result of the preceding steps is that the further communication clients (including at least circuit-switched client 210) begin ringing, as shown by step 712.

At step 714, the communication session set up request is accepted by one of the further communication clients on the one or more communication devices 108 associated with the user. In the embodiments shown in FIG. 7 the communication session is accepted at circuit-switched client 210, resulting in the transmittal of a communication session acceptance message from circuit-switched communication client 214 back to call control system 106 via circuit-switched network 104, as shown by 7c and 7d.

After receiving the communication session acceptance message, call control system 106 establishes a new communication session leg between an intermediate node in the telecommunications network and circuit-switched client 210, as shown by step 716. This new communication session leg between circuit-switched client 210 and an intermediate node in the telecommunications network is connected to the maintained communication session leg between remote party device 126 and the corresponding intermediate node in the telecommunications network, as shown by 718. The result of connecting the new communication session leg established between circuit-switched client 210 and the corresponding intermediate node to the maintained communication session leg established between remote party device 126 and the corresponding intermediate node is to complete an end-to-end communication session between the communication client on remote party device 126 and circuit-switched client 210 on a device associated with the user, thereby allowing the remote party and the user to continue conducting communications, as shown by step 720.

Whilst the embodiments described above in relation to FIGS. 6 and 7 send communication session setup requests to all of the user's available communication clients, other embodiments utilise methods described previously to direct communication session setup requests to a subset of the user's associated communication clients. In some such embodiments, this is to conform to user defined complex ringing scenarios. In other such embodiments, knowledge of which of the user's communication devices 108 the various communication clients are equipped to allows the communication session setup request to be directed to a communication client that is co-located with the communication client that experienced the loss in connectivity. Advantageously, this provides the highest chance of causing a device to ring that the user has to hand.

According to some such embodiments, each communication client is configured to automatically accept a communication session setup request that relates to a communication session that was previously established with a co-located communication client. In relation to FIGS. 6 and 7, this comprises sending acceptance message 6b and 7c/d without requiring user input. This prevents the device to which those clients are equipped from exhibiting ringing behaviour under these circumstances, which as the device may still be against the user's ear, might result in an unpleasant user experience. If the co-located client is immediately available to conduct communications when the communication session setup requests are transmitted, the re-establishment of the communication session can feasibly occur quickly enough as to be unnoticeable to either the user or the remote party, thereby maintaining the communication session despite the initial loss in connectivity.

In some such embodiments, the communication session setup request includes an identifier for the associated communication session, which, when received by the communication client on the user device, is compared to a known communication session identifier for the communication session previously established with the co-located communication client. If the identifiers match, then the communication session setup is automatically accepted.

In other such embodiments, the communication session setup request includes an identifier for the targeted communication client, which, when received by the communication client on the user device, is compared its own communication client identifier. If the identifiers match, then the communication session setup is automatically accepted.

In alternative embodiments the communication session setup request is not accepted by the co-located communication client. According to some such embodiments, this is because the user's co-located communication client is also unavailable, for example because the device has run out of battery. In such embodiments, the attempt of call control system 106 to initiate the setup of a further communication session leg fails. In some such embodiments, failure of the attempt to initiate the setup of a further communication session leg is detected by having not received a communication session setup acceptance message within a predetermined time period. According to some embodiments, in response to detecting failure of the attempt to initiate the setup of the further communication session leg via the co-located communication client, call control system 106 transmits communication session setup messages to one or more of the remaining further communication clients associated with the user.

Figure 8:
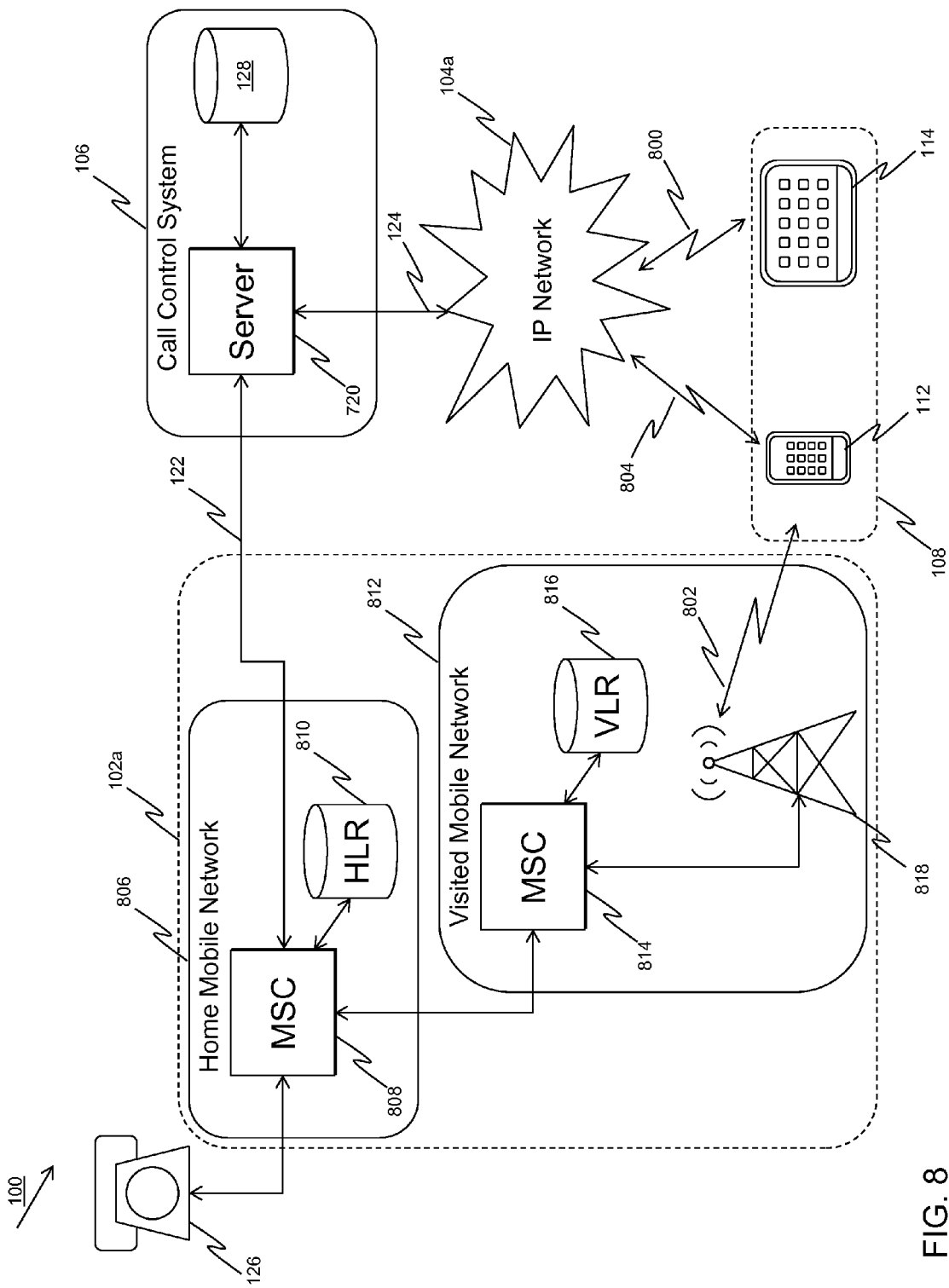
FIG. 8 shows the telecommunications network depicted in FIG. 1 in more detail according to embodiments.

FIG. 8 shows telecommunications network 100 depicted in FIG. 1 in more detail according to embodiments; in such embodiments, circuit-switched network part 102 comprises a mobile (or 'cellular') telephony network part 102a, and packet-switched network part 104 comprises IP network part 104a. A client-shared telephony service is hosted and controlled by a call control system 106.

According to the embodiments shown in FIG. 8, a user of the client-shared telephony service has a number of devices 108 associated with their client-shared dialling number through which they may conduct communications via the service. The user's associated devices include, at least, mobile telephone 112. In embodiments, the user's associated devices also include tablet 114.

Mobile telephone 112 is equipped with a cellular radio telephony interface and circuit-switched communications client for conducting communications in telecommunications network 100 via radio link 802 with mobile telephony network part 102a. Mobile telephone 112 is also equipped with at least one wireless packet-switched interface and packet-switched communications client for conducting communications in telecommunications network 100 via radio link 804 with IP network part 104a. This wireless packet-switched interface could comprise a short-range radio interface such as WiFi or Bluetooth, and/or an interface for communication of packet data over a mobile network, such as LTE-A, HSPA, W-CDMA or Mobile WiMax. In such embodiments where mobile telephone 112 is equipped with multiple communication clients, the communication clients can be referred to as co-located communication clients.

Tablet 114 is equipped with at least one wireless packet-switched interface and packet-switched communications client for conducting communications in telecommunications network 100 via radio link 800 with IP network part 104a.

Mobile telephony network part 102a allows for provision of telephony services to a number of mobile telephones, although only the user's mobile telephone 810 is depicted. Mobile telephony network part 102a comprises home mobile network part 806, which is generally associated with mobile telephone 112. Communication sessions initiated to a telephone dialling number associated with mobile telephone 112, e.g. a Mobile Station International Subscriber Directory Number (MSISDN), are routed to home mobile network part 806 for processing as a result of that general association. Home mobile network part 806 comprises mobile switching centre (MSC) 808 and home location register (HLR) 810. HLR 810 comprises a database which provides MSC 808 with data relating to users generally associated with home mobile network 806 upon request, such as the location of their mobile telephones and any configuration data (such as call routing triggers, billing information etc.).

Mobile telephony network part 102a also comprises visited mobile network part 812, which is transiently associated with mobile telephone 112. Visited mobile network part 812 comprises serving MSC 814, Visitor Location Register (VLR) 816 and base transceiver station (BTS) 818. BTS 818 transmits radio signals to, and receives radio signals from, the circuit-switched communications client and cellular radio telephony interface on mobile telephone 112 and radio communication link 802. It is this communication relationship that provides the transient association between mobile telephone 112 and visited mobile network part 812. Mobile telephone 112 is located in an area (commonly known as a 'cell') served by BTS 818. BTS 818 may be controlled by a basestation controller (BSC; not shown), which may also control a number of further BTSs (also not shown), which in combination with a number of further BSCs and BTSs, may provide a large number of geographically distributed cells served by MSC 814.

When mobile telephone 112 associates with serving MSC 814 (e.g. by entering a cell served by MSC 814), serving MSC 814 informs home MSC 808, which in turn updates HLR 810 with the location of mobile telephone 112. In this way, HLR 810 is kept up to date with the most recent location of mobile phone 112. Additionally, any configuration data relating to mobile telephone 112 is copied into VLR 816. This allows calls placed by the circuit-switched client on mobile telephone 112 while being served by serving MSC 814 to be correctly handled according to the aforementioned configuration data.

Depending on the location of mobile telephone 112, home mobile network part 806 may also serve mobile telephone 112, in which case it will comprise the same network part as visited mobile network part 812.

According to embodiments, the client-shared telephony service is provided by associating one or more communication clients (including the packet-switched communication client on mobile telephone 112) with a telephone dialling number associated with the circuit-switched communication client on mobile telephony device 112, such as its MSISDN. This can be referred to as twinning the additional communication clients with the circuit-switched communication client. According to such embodiments, the client-shared dialling number is therefore the MSISDN of the circuit-switched communication client on mobile telephony device 112.

A communication session between a communication client on one of the user's devices 108 and a communication client on a device of a remote party 126 is routed between the remote party device 126 and home mobile network part 806 via one or more further network parts (not shown). In some embodiments, remote party device 126 is also a mobile telephone, in which case the communication session may be routed via one or more serving mobile network parts and home mobile network parts associated with the remote party device. These could be the same as mobile network parts 806 and/or 812, or further mobile network parts (not shown). In other embodiments, remote party device 126 is a fixed line circuit-switched telephone, such as a POTS telephone, in which case the communication session may be routed via the PSTN and one or more gateway entities, such as a gateway MSC, to convert between the various protocols and data formats used to transfer media data and signalling data in the PSTN and mobile telephony network part 102a. Home MSC 808 may fulfil the role of the gateway entity, or it may be fulfilled by another intermediate entity. In further alternative embodiments, remote party device 126 is an IP telephony device, such as SIP telephone, in which case the communication session may be routed via an IP network, such as the internet, and one or more gateway entities. Again, home MSC 808 may fulfil the role of the gateway entity, or it may be fulfilled by another intermediate entity.

A communication session between a communication client on one of the user's devices 108 and a communication client on remote party device 126 can be routed between mobile telephony network part 102a and call control system 106 via link 122, which could be, for example, a SIP trunk, or other high capacity communications link. In the embodiments shown in FIG. 8, home MSC 808 is shown as being the gateway entity between mobile network part 102a and call control system 106, however, this role could equally be performed by another entity in mobile network part 102a, such as serving MSC 814. Further, the links between IP network part 104a, call control system 106 and mobile telephony network part 102a may comprise one or more gateway or session border controller entities (not shown) which carry out conversion between the various protocols and data formats used to transfer media data and signalling data in the different networks making up telecommunications network 100.

In order to provide the client-shared telephony service, mobile telephony network part 102a is configured to route communication session setup, signalling and or/media data relating to one of the user's devices 108 via call control system 106. This can be achieved by configuring HLR 810 with one or more trigger conditions for communication session data relating to the client-shared dialling number, such that data originating from or directed to that dialling number results in appropriate communication session signalling data being sent to call control system 106. According to some embodiments, this could be a routing query to establish where the communication session data should be routed.

In other embodiments, the communication session data itself may be routed to call control system 106, which then handles the sending of communication session data to any appropriate further entities. In such embodiments, communication session data transmitted from call control system 106 to the circuit-switched client on mobile telephone 112 would be undesirably routed back to call control system 106 by mobile telephony network 102a if routed by conventional methods on the basis of the MSISDN of the circuit-switched client. There are several methods for overcoming this behaviour, for example, the transmitted data may include additional information to indicate that the triggers stored in HLR 810 should not be utilised, causing HLR 810 to return the location of the mobile telephone 112 instead of invoking the associated trigger. Alternatively, call control system may be adapted to query HLR 810 directly via a further interface (not shown) to obtain a temporary routing number (TRN) for communicating with the circuit-switched client on mobile telephone 112. Routing communications to the circuit-switched client on mobile telephone 112 via such a TRN would not invoke the triggers stored in HLR 810, as the client-shared dialling number is not used.

Call control system 106 comprises call control server 820, and user database 128. Call control server 818 is responsible for processing communication session data relating to the user, and is aided in doing so by user database 128. Call control system 106 may further comprise a media gateway controller, service platform, call agent, application server or softswitch and may perform other functions typically associated with such entities. The elements comprised by call control system 106 may be located within mobile telephony network part 102a and/or IP network part 104a, or one or more other networks (not shown).

Figure 9:
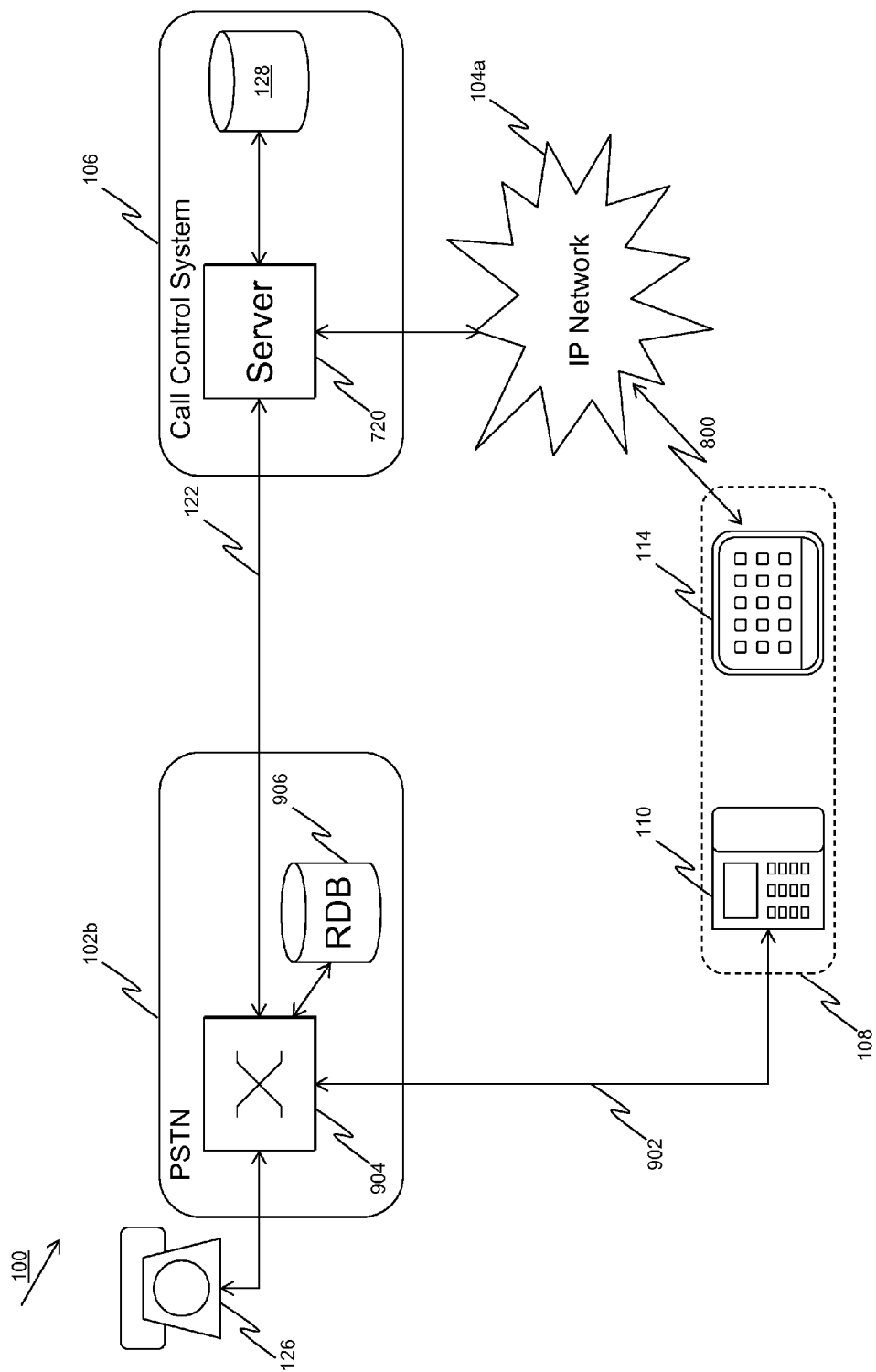
FIG. 9 shows the telecommunications network depicted in FIG. 1 in more detail according to further embodiments.

FIG. 9 shows telecommunications network 100 depicted in FIG. 1 in more detail according to embodiments; in such embodiments, circuit-switched network part 102 comprises a fixed line telephony network part 102b (such as the PSTN), and packet-switched network part 104 comprises IP network part 104a. A client-shared telephony service is hosted and controlled by a call control system 106, which comprises call control server 820 and user database 120, the functions of which are the same as described previously in relation to FIGS. 1 and 8.

Circuit-switched fixed line telephony network 102b comprises telephone switch 904 and routing database 906. Routing database 906 is queried by telephone switch 904 in order to establish how to route communication session data. As well as providing basic routing information, routing database 906 can be configured with a number of triggers in relation to certain calling or called parties. In embodiments of the present disclosure, routing database 906 is configured to route all communication session data either originating from, or directed to, one of the users devices 108 via call control system 106.

In the embodiment shown in FIG. 9, the user's communication devices 108 comprise desk phone 110 and tablet 114. Desk phone 110 is configured with a fixed-line circuit-switched PSTN interface and a circuit-switched communication client for conducting communications in telecommunications network 100 via fixed-line link 902 with PSTN network part 102b. Tablet 114 is equipped with a wireless packet-switched interface and a packet-switched client for communicating for conducting communications in telecommunications network 100 via radio link 800 with IP network part 104a. The packet-switched client on tablet 114 has been configured into the client-shared telephony service with respect to a telephone dialling number associated with the circuit-switched client on desk phone 110. Again, this can also be described by referring to the packet-switched communication client on tablet 114 as having been twinned with the circuit-switched client on desk phone 110.

The above embodiments are to be understood as illustrative examples of the invention. Further embodiments of the invention are envisaged. For example, the invention is fully compatible with an IP Multimedia Subsystem (IMS) telecommunications network. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling a communication session established in a telecommunications network, the method comprising:

detecting a loss in connectivity associated with a first communication session leg of a communication session, the communication session having been established between a first communication client of a plurality of communication clients on a plurality of communication devices associated with a first party and a communication device associated with a second party, wherein the established communication session comprises at least the first communication session leg, the first communication session having been established between the first communication client and a first intermediate node in the telecommunications network;

in response to detecting said loss in connectivity, initiating set up of a second communication session leg between a second intermediate node in said telecommunications network and at least a second communication client of said plurality of communication clients on the plurality of communication devices associated with the first party; and identifying, among the plurality of communication clients associated with the first party, one or more communication clients which are co-located with the first communication client on a given communication device in the plurality of communication devices associated with the first party, wherein the initiating comprises transmitting a communication session setup request to the identified one or more co-located communication clients on the given communication device in preference to at least one other communication client associated with the first party on at least one communication device other than the given communication device in the plurality of communication devices associated with the first party.

2. The method according claim 1, wherein said established communication session further comprises a third communication session leg established between a third intermediate node in said telecommunications network and the communication device associated with the second party, the method comprising maintaining said third communication session leg subsequent to detecting said change in connectivity.

3. The method according to claim 2, further comprising bridging said third communication session leg and said second communication session leg in response to establishing said second communication session leg.

4. The method according to claim 1, further comprising establishing said second communication session leg in response to receiving a communication session acceptance message from said second communication client in relation to the set up of said second communication session leg.

5. The method according to claim 4, further comprising tearing down said first communication session leg in response to establishing said second communication session leg.

6. The method according to claim 1, wherein said initiating step comprises transmitting a communication session setup request to one or more further communication clients associated with said first party, said one or more further communication clients including at least said second communication client.

7. The method according to claim 1, further comprising including in said communication session setup request, an identifier associated with said one or more identified co-located communication clients, whereby to allow establishment of said communication session to be automatically accepted by one of said one or more identified co-located communication clients.

8. The method according to claim 1, further comprising including in said communication session setup request, an identifier for said communication session, whereby to allow establishment of said second communication session leg to be automatically accepted by one of said one or more identified co-located communication clients.

9. The method according to claim 1, further comprising transmitting said communication session setup request to one or more of said remaining communication clients associated with the first party in response to determining, upon a predetermined amount of time elapsing after initiating setup of said second communication session leg, that said second communication session leg has not been established.

10. The method according to claim 1, further comprising revoking said communication session setup requests in relation to the other of said further communication clients in response to establishing said second communication session leg in relation to said second communication client.

11. The method according to claim 1, further comprising transmitting a communication session maintenance notification to the communication device associated with said second party, whereby to inform said second party that an attempt to maintain the communication session is being performed, after the loss of connectivity in the first communication session leg has been detected, and before the second communication session leg has been established.

12. The method according to claim 11, wherein said communication session maintenance notification is transmitted in response one or more trigger conditions occurring after the loss of connectivity in the first communication session leg has been detected, and before the second communication session leg has been established.

13. The method according to claim 12, wherein said trigger condition comprises determining, upon a predetermined amount of time elapsing after detecting said loss in connectivity, that said second communication session leg has not been established.

14. The method according to claim 1, further comprising tearing down said established communication session in response to determining, upon a predetermined amount of time elapsing after initiating setup of said second communication session leg, that said second communication session leg has not been established.

15. The method according to claim 1, wherein said first communication client is associated with a first communication interface capable of communicating via a first part of said telecommunications network and said second communication client is associated with a second communication interface capable of communicating via a second, different part of said telecommunications network.

16. The method according to claim 15, wherein said first communication interface and said second communication interface are associated with different access technologies.

17. The method according to claim 16, wherein said call control system comprises one or more of said first or second intermediate nodes.

18. The method according to claim 16, wherein said call control system is located in a packet-switched part of said telecommunications network.

19. The method according to claim 1, wherein said method is performed at a call control system.

20. The method according to claim 1, wherein the first and second intermediate nodes are a single intermediate node.

21. Apparatus for use in controlling a communication session established in a telecommunications network, the apparatus comprising:
    at least one processor; and
    at least one memory including computer program code, the memory and the computer program code being configured to cause the processor to:
        detect a loss in connectivity associated with a first communication session leg of a communication session, the communication session having been established between a first communication client of a plurality of communication clients on a plurality of communication devices associated with a first party and a communication device associated with a second party,
        wherein the established communication session comprises at least the first communication session leg, the first communication session having been established between the first communication client and a second intermediate node in the telecommunications network;
        in response to detecting said loss in connectivity, initiate set up of a second communication session leg between a second intermediate node in said telecommunications network and at least a second communication client of said plurality of communication clients on the plurality of communication devices associated with the first party; and
        identify among the plurality of communication clients associated with the first party, one or more communication clients which are co-located with the first communication client on a given communication device in the plurality of communication devices associated with the first party,
        wherein the initiation comprises transmission of a communication session setup request to the identified one or more co-located communication clients on the given communication device in preference to at least one other communication client associated with the first party on at least one communication device other than the given communication device in the plurality of communication devices associated with the first party.

22. A computer program product comprising a non-transitory computer-readable storage medium having computer readable instructions stored thereon, the computer readable instructions being executable by a computerized device to cause the computerized device to perform a method of controlling a communication session established in a telecommunications network, the method comprising:
    detecting a loss in connectivity associated with a first communication session leg of a communication session, the communication session having been established between a first communication client of a plurality of communication clients on a plurality of communication devices associated with a first party and a communication device associated with a second party,
    wherein the established communication session comprises at least the first communication session leg, the first communication session having been established between the first communication client and a first intermediate node in the telecommunications network;
    in response to detecting said loss in connectivity, initiating set up of a second communication session leg between a second intermediate node in said telecommunications network and at least a second communication client of said plurality of communication clients on the plurality of communication devices associated with the first party; and
    identifying, among the plurality of communication clients associated with the first party, one or more communication clients which are co-located with the first communication client on a given communication device in the plurality of communication devices associated with the first party,
    wherein the initiating comprises transmitting a communication session setup request to the identified on or more co-located communication clients on the given communication device in preference to at least one other communication client associated with the first party on at least one communication device other than the given communication device in the plurality of communication devices associated with the first party.

23. A method of controlling a communication session established in a telecommunications network, the method comprising, at a first communication device of a plurality of communication devices associated with a first party:
    detecting a loss in connectivity associated with a first communication session leg of a communication session, the communication session having been established between a first communication client of a plurality of communication clients on the plurality of communication devices associated with the first party and a communication device associated with a second party,
    wherein the established communication session comprises at least the first communication session leg, the first communication session having been established between the first communication client and a first intermediate node in the telecommunication network;
    receiving a subsequent communication session setup request directed to a second communication client on said first communication device, the subsequent communication session setup request having been transmitted to the second communication client on the first given communication device in preference to at least one other communication client associated with the first party on at least one communication device other than the first communication device in the plurality of communication devices associated with the first party on the basis that the second communication client was identified as being co-located with the first communication client on the first communication device;
    determining that said subsequent communication session setup request relates to said established communication session; and
    in response to determining that said subsequent communication session setup request relates to said established communication session, transmitting a communication session acceptance message from said second communication client.

* * * * *